United States Patent

Fredlund et al.

[11] Patent Number: 5,726,737
[45] Date of Patent: Mar. 10, 1998

[54] SYSTEM FOR CONTROLLING PHOTOFINISHING OF PHOTOSENSITIVE MATERIAL

[75] Inventors: John Randall Fredlund, Rochester; Arthur Evan Smart, Pittsford, both of N.Y.

[73] Assignee: Eastman Kodak Company, Rochester, N.Y.

[21] Appl. No.: 698,709

[22] Filed: Aug. 16, 1996

[51] Int. Cl.⁶ .............. G03B 27/52; G03B 7/00; G03B 17/24
[52] U.S. Cl. .............. 355/40; 355/77; 396/319; 396/311
[58] Field of Search .............. 396/207, 210, 396/311, 319, 566, 300; 355/27–29, 40, 41, 77; 352/236

[56] References Cited

U.S. PATENT DOCUMENTS

| | | | |
|---|---|---|---|
| 3,260,182 | 7/1966 | Nerwin. | |
| 4,842,391 | 6/1989 | Kim et al. | 385/35 |
| 4,853,733 | 8/1989 | Watanabe et al. | 396/300 |
| 4,933,780 | 6/1990 | Wash et al. | 396/319 |
| 4,947,196 | 8/1990 | Wash et al. | 396/320 |
| 4,958,181 | 9/1990 | Ishikawa et al. | 396/299 |
| 5,016,030 | 5/1991 | Dwyer et al. | 396/319 |
| 5,021,820 | 6/1991 | Robison et al. | 355/40 |
| 5,029,313 | 7/1991 | Robison et al. | 355/40 |
| 5,031,852 | 7/1991 | Dowling et al. | 396/516 |
| 5,043,758 | 8/1991 | Nealon | 355/40 |
| 5,072,253 | 12/1991 | Patton | 355/40 |
| 5,184,169 | 2/1993 | Nishitani | 396/543 |
| 5,191,372 | 3/1993 | Aihara | 396/130 |
| 5,215,273 | 6/1993 | Greene | 242/550 |
| 5,227,835 | 7/1993 | Anagnostopoulos | 396/49 |
| 5,229,810 | 7/1993 | Cloutier et al. | 355/40 |
| 5,278,603 | 1/1994 | Kazumi | 396/57 |
| 5,333,033 | 7/1994 | Blackman | 355/27 |

FOREIGN PATENT DOCUMENTS 7-58281  3/1995  Japan.

*Primary Examiner*—D. Rutledge
*Attorney, Agent, or Firm*—Frank Pincelli

[57] ABSTRACT

A system and method for controlling the photofinishing of a roll of photosensitive material in accordance with the customer usage of the film. The film having a magnetic layer on which an instructional code is placed either by the manufacturer and/or user of the film. The instructional code is indicative of the preferential subject matter to be photographed. The system may include a camera for use in reading the predetermined code and adjusting the camera settings in accordance with the instructional code. The photofinisher can use the instructional code so as to properly manipulate the image during processing and/or printing in accordance with the instructional code.

20 Claims, 5 Drawing Sheets

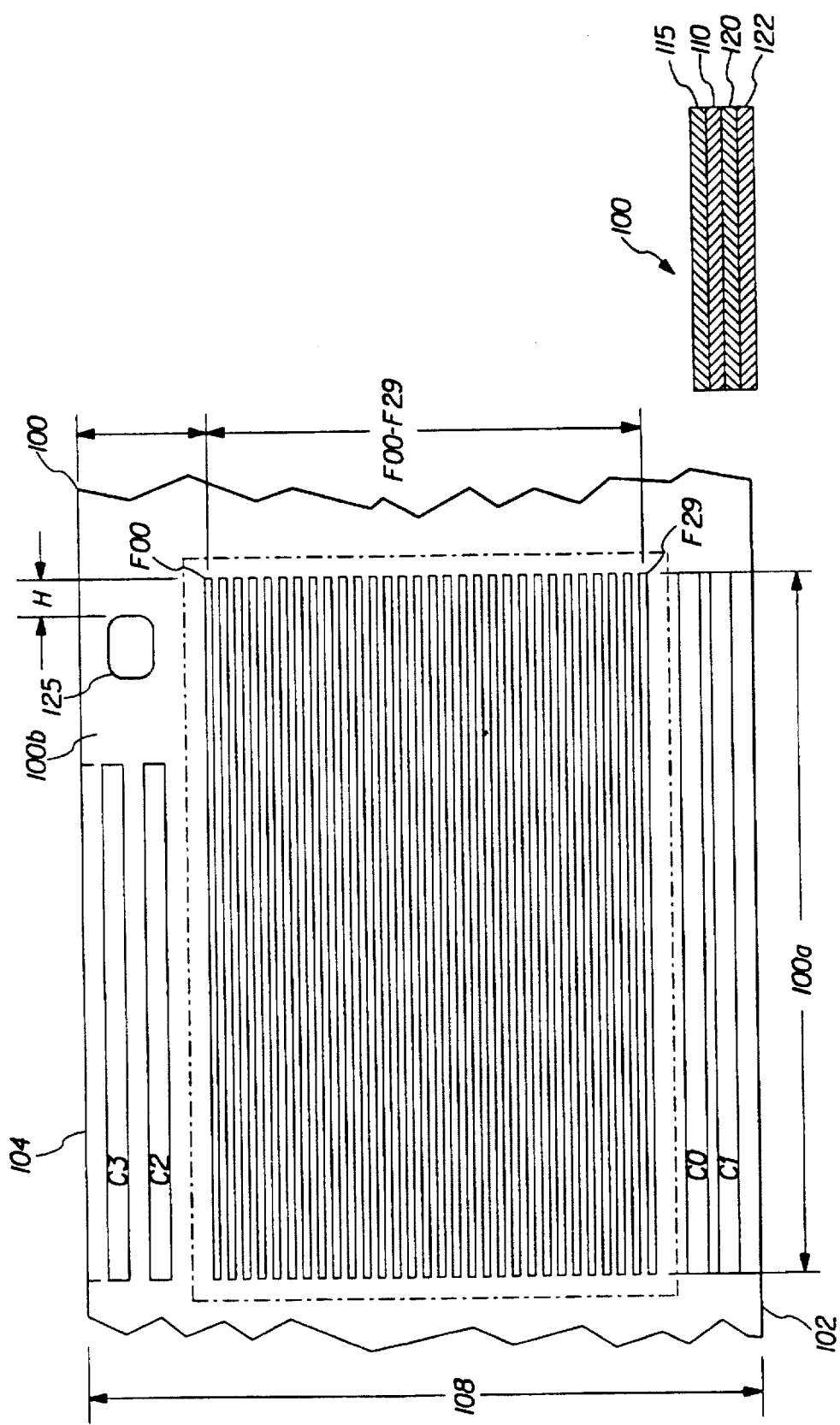

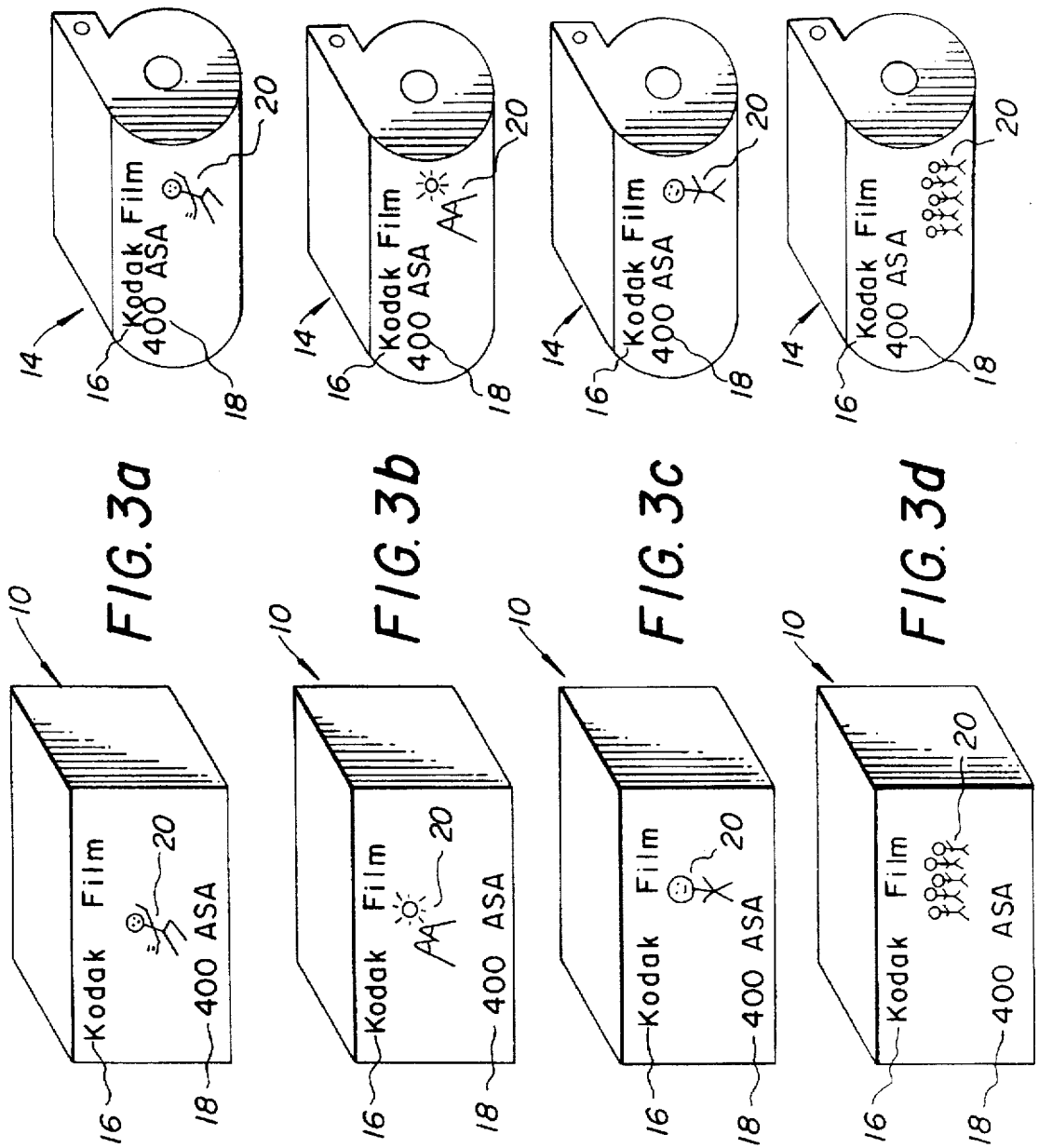

U.S. Patent        Mar. 10, 1998        Sheet 4 of 5        5,726,737
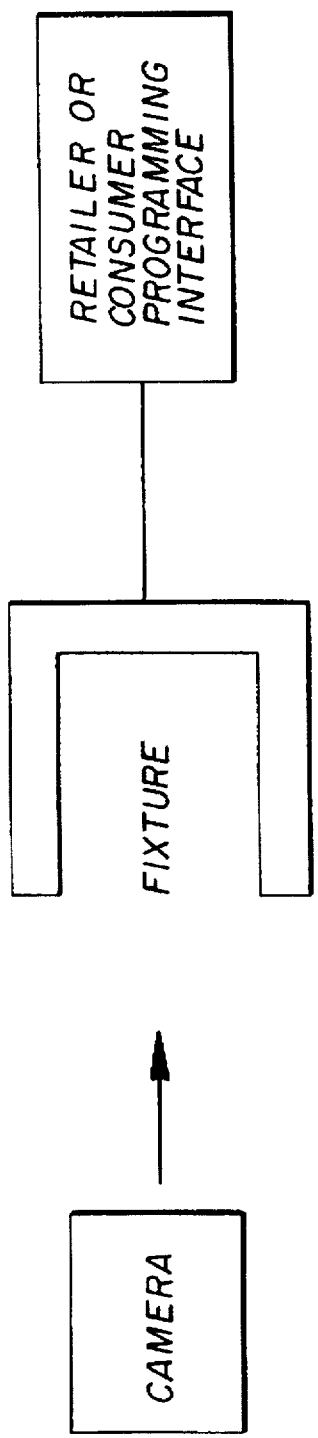
FIG. 8
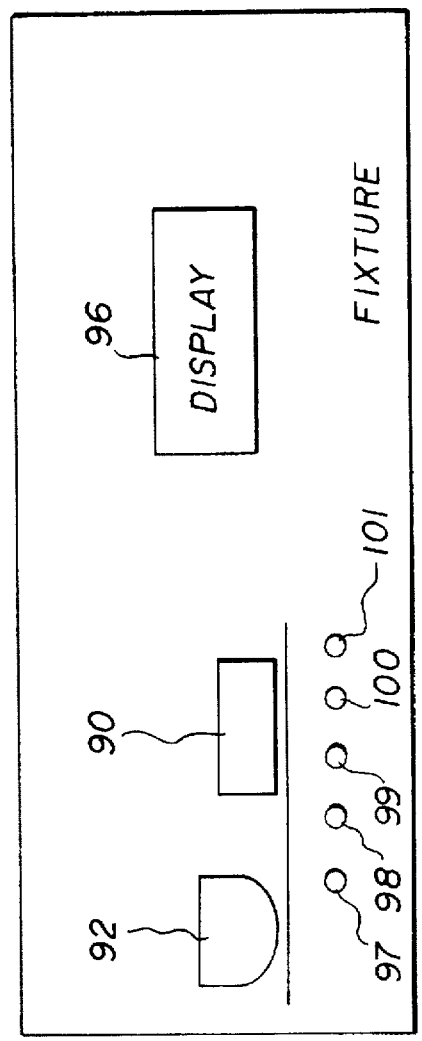
FIG. 10

SYSTEM FOR CONTROLLING PHOTOFINISHING OF PHOTOSENSITIVE MATERIAL

CROSS REFERENCE TO RELATED APPLICATION

Reference is made to and priority claimed from U.S. Provisional application Ser. No. 60/006,177, filed 02 Nov. 1995, entitled SYSTEM FOR CONTROLLING PHOTOFINISHING OF PHOTOSENSITIVE MATERIAL.

FIELD OF THE INVENTION

The present invention relates to photofinishing and, more particularly, a system for controlling photofinishing of a photosensitive material.

BACKGROUND OF THE INVENTION

A typical chemical base system for capturing and printing photographic images is dedicated to a single mode of operation. The consumer/photographer exercises some choice in the selection of a camera, and type of film, which is typically directed to the speed of the film and/or whether it is color, and once again, when the photofinishing options are selected. In each of these selection processes, the consumer's options are completely limited by the set of options offered to him by the manufacturer. He is unable to mix-and-match the features offered to his personal needs. While some film is sold based on its use, i.e., indoor or outdoor use, film is typically not sold based on the characteristics of the subject matter to be photographed. In the photofinishing system, and more particularly, in the printing process, algorithms are used for determining the appropriate printing conditions that should be used in printing of the image onto photographic paper. The film type may or may not be taken into consideration. Thus, the prior art has been limited with respect to the ability of printing images in accordance with the customer desires.

The present invention improves the customer/photographer's ability to more personalize the type of picture desired. Additionally, the proposed system minimizes the involvement of the user with regard to programing of the camera to the desired setting, thus minimizing confusion and error that may be caused by the inaccurate setting of the camera by the user. Additionally, the photofinishing system is able to further adjust and control printing of the film in accordance with the subject matter produced.

SUMMARY OF THE INVENTION

In one aspect of the present invention there is provided a system for controlling the photofinishing of a roll of photosensitive material in accordance with the customer usage of the film, comprising:

a photosensitive material having a magnetic layer, the magnetic layer having a predetermined instructional code placed thereon by the manufacturer of the photosensitive material indicative of the preferential subject matter to be photographed; and a camera for use in reading the predetermined code, and means for adjusting the camera settings in accordance with the predetermined instructional code.

In another aspect of the present invention, there is provided a camera designed to receive a roll of photosensitive film having a magnetic layer thereon. The camera includes selection buttons, each corresponding to a camera operation selection indicative of a particular subject matter to be photographed. The camera also has means for applying an instructional code on the magnetic layer indicative of the operation selection selected. The information instructional code placed on the film is used by the photofinisher in controlling the photofinishing process of the photosensitive film.

In yet another aspect of the present invention there is provided a system for controlling photofinishing of a strip of photosensitive material based on information magnetically placed on the strip of photosensitive material. The information is indicative of the type of use to which the camera containing the film has been used. The system comprising:

a device designed to receive a roll of photosensitive film having a magnetic layer thereon, the device including selection means having a plurality of operation selections, each of the operation selections being indicative of a particular subject matter to be photographed, the device having means for applying an instructional code on the magnetic layer indicative of the operation selection selected, the information instructional code being used by the photofinisher in controlling the photofinishing process of the photosensitive film; and a photofinishing apparatus for producing prints from the roll of photosensitive film in accordance with the instructional code.

In yet still another aspect of the present invention there is provided a method for controlling the photofinishing of a roll of photosensitive material in accordance with the customer usage of the roll of photosensitive material. The method comprising the steps of:

placing a predetermined code on a magnetic layer provided on a photosensitive material by the manufacturer, the code being indicative of the preferential use of the photosensitive material; and developing and/or printing the photosensitive material in accordance with the predetermined instruction codes.

DESCRIPTION OF THE DRAWINGS

Additional advantages and features of the invention will become apparent from the detailed description given hereinafter in relation to the accompanying drawings in which:

FIG. 1 is a plan view of a prior art photographic filmstrip with a MOF layer and dedicated recording tracks which can be employed in the practice of the invention;

FIG. 2 is a side cross-sectional view of the prior art filmstrip of FIG. 1;

FIG. 3a is a perspective view of a film package containing a film cartridge made in accordance with the present invention illustrating the preferential subject matter of the type to be photographed with the film disposed therein;

FIG. 3b is a perspective view of another film package containing a film cartridge illustrating another preferential subject matter to be used in photographing the film;

FIG. 3c is a perspective view of yet another film package containing a film cartridge illustrating another preferential subject matter to be used in photographing the film;

FIG. 3d is a perspective view of another film package containing a film cartridge illustrating another preferential subject matter to be used in photographing the film;

FIGS. 4a–4d illustrate film cartridges each containing a filmstrip which is placed within the packaging illustrated in FIGS. 3a–3d, respectively;

FIG. 8 is a schematic illustration illustrating how the camera of FIGS. 6 and 7 may be programmed for alternate uses;

FIG. 10 is a schematic illustration of a device made in accordance with the present invention designed to receive developed film in a film cartridge designed for scanning of a developed or undeveloped image and placing the code thereon for use by the photofinisher in reprinting of the images.

DETAILED DESCRIPTION OF THE INVENTION

Figure 5:
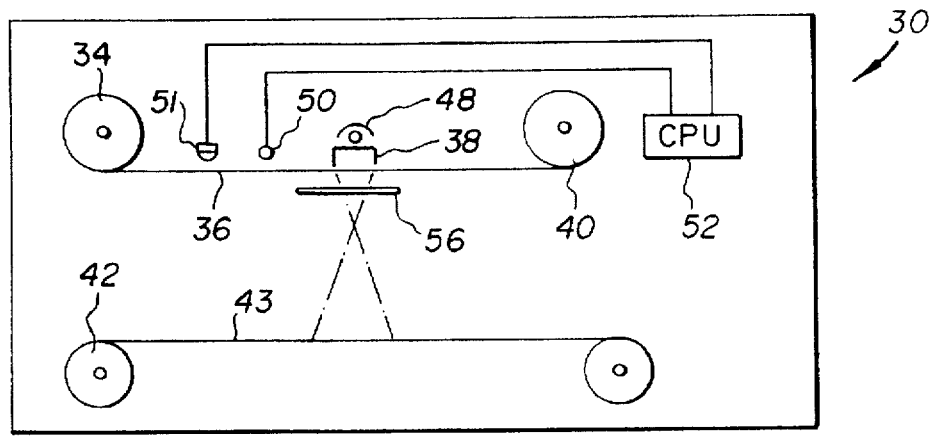
FIG. 5 is a schematic view of a photofinishing apparatus used to print images onto photographic paper using the film sold in the cartridge packages of FIGS. 3a–3d to FIGS. 4a–4b.

The present invention is practiced with a photosensitive material having a MOF (magnetics-on-film) layer. Referring to FIG. 1, there is illustrated a photographic filmstrip having a virtually transparent, magnetic film layer on the non-emulsion side of the filmstrip (referred to as an "MOF layer") such as disclosed and described in U.S. Pat. Nos. 4,933,780; 5,016,030; and 5,229,810. In particular, FIGS. 1 and 2 schematically depict a filmstrip 100 of the type described in the '810 patent having a base 110 with photographic emulsion layers 115 on one side and a virtually transparent MOF layer 120 on the non-emulsion side, an antistatic and lubricating layer 122 covers the MOF layer 120, and perforations 125 are provided for metering image frame areas through the camera exposure gate. Each image frame area of the filmstrip 100 includes a set of edge strip regions of the MOF layer 120, e.g., regions 100a,100b, including record/reproduced track pairs C0,C1,C2,C3 adjacent to respective film edges 102,104. Essential image frame regions of the MOF layer 120 includes tracks F00–F29 extending the image frame length 100a. The filmstrip 100 has a predetermined nominal width 108 for the filmstrip type, and tracks C0–C3 and F00–F29 have defined widths. As described in the '810 patent in detail, the edge tracks C0–C3 are intended to be used for recording exposure related information in a camera having edge mounted magnetic recording heads. Certain other tracks F00–F29 are intended to contain filmstrip-type information prerecorded by the manufacturer, and other tracks F00–F29 are reserved for recording information during photofinishing.

In a variation of the filmstrip 100, recording and reproducing in the tracks F00–F29 is not practiced, and the MOF layer 120 may or may not be coated over the image frame area. In the embodiment illustrated, one or more of the tracks C0–C3 in the edge regions 100a,100b are used for recording print related information, e.g., the color correction exposure data applied to the most recent set of prints made from the image frame. In such photofinishing equipment such as described in the above-referenced U.S. Ser. No. 08/171,582; filed Dec. 22, 1993 now U.S. Pat. No. 5,473,402, by Francis C. Long, Walter C. Slater, Thomas J. Murray, Bradley C. DeCook, and Howard C. Bozenhard, entitled FILM PROCESSING SYSTEM, certain of the tracks are read out prior to printing to control printing operations, and the print related information is recorded in the recording tracks contemporaneously with making the print exposure.

Referring to FIG. 3a, there is illustrated a package 10 containing a film cartridge 14 such as illustrated in FIG. 4a. The package 10 and cartridge 14 includes a variety of information that is typically found on such items. For example, in the embodiment illustrated, the package and film cartridge includes trademarks identified by numeral 16, which identifies the manufacturer. Also, the photographic speed of the film, as indicated by numeral 18, is provided. In accordance with the present invention, there is further provided indicia 20 which is indicative as to the type of subject matter to be photographed. For example, as illustrated in FIG. 3a, there is stick representation of a person running. This indicia would be indicative of photographs wherein the subject matter to be photographed is moving, for example, individuals playing action sports such as football, golf, tennis, baseball, soccer, race cars, etc. The manufacturer of the film places a code on the magnetic layer 120, which is read by the photofinishing equipment used by the photofinisher.

Referring to FIG. 5, there is illustrated an apparatus 30 used in the photofinishing process. In particular, the apparatus 30 is an optical printing apparatus designed to receive developed photographic film in a continuous web form whereby the image on the web is exposed onto photographic paper 43 so as to produce an image thereon which is later sent through a developing process and then later cut and sorted and returned to the appropriate customer. In the particular embodiment illustrated, the apparatus 30 includes a supply reel 34 containing a web of developed photosensitive film 36, which is fed through a print gate 38 and then onto a take-up reel 40 where the web 36 is wound. The apparatus 30 also includes a paper supply reel 42 containing a web of photographic paper 43 wherein the images disposed at the print gate 38 are focused for forming of images on the paper 43. An appropriate light source 48 is provided for exposing of the images that are sequentially placed at the print gate 38. Sensor 50 is provided for scanning of the film and providing information to the CPU 52 (central processing unit) of the apparatus 30. The CPU 52 controls operation of the apparatus, including the light source 48 and filters 56, which are used to control the exposure at the print gate 38. The sensor 50, in the particular embodiment illustrated, is a CCD array (charged coupled device), which is used to scan the image and provide certain information to CPU 52. There is also provided a magnetic read head 51 for reading of the information on the magnetic layer. Information that is read by head 51 is also sent onto the CPU 52 and then this information is used for controlling operation of the device 30. In the particular embodiment illustrated, the read head 51 reads the codes that have been provided on the film which relate to the type of picture that has been taken. This information is sent to the CPU which then properly selects the appropriate algorithms for (stored in the CPU 52) controlling exposure of the film at the print gate. The CPU is pre-programmed with various exposure algorithms for controlling exposure of the film in accordance with sensor 50 and any instructional codes read on the film by reader 51.

In the above embodiment the images obtained from the film are optically printed. However, the images may be printed by any desired technique. For example, the images may be scanned from the film by a CCD array where the image is digitally captured and sent to a digital printer such as a thermal printer or electrostatic printer. The instructional codes would also be read from the film and which would be used by the digital printer to digitally manipulate the image in accordance to the instructional codes.

Referring to FIG. 3b, there is illustrated a package 10 containing a film with a different instructional code thereon. In the particular embodiment illustrated, the indicia 20 is directed to shots that are scenic and outdoors. Referring to FIG. 3c, indicia 20 therein is designed to illustrate that the film is designed for use wherein the subjects are people having a particular skin tone color, for example, light or dark skin tones. Referring to FIG. 3d, there is indicated indicia 20 which illustrates that the film is to be used for group-type shots. It is, of course, understood that various type subject matter may be taken into account. Each type subject matter would have its own indicia and corresponding instructional code, which can be placed on the film by the manufacturer. Thus, when the film is taken to the photofinisher for printing, the appropriate instruction code will be scanned/read and used to control the printing of the film in accordance with the appropriate algorithms for that indicia selected. Additionally, if the camera is capable of reading the instructional code placed on the film by the manufacturer, the camera can make appropriate settings in accordance with the instructional code which will further assist in improving the quality of the print.

Figure 6:
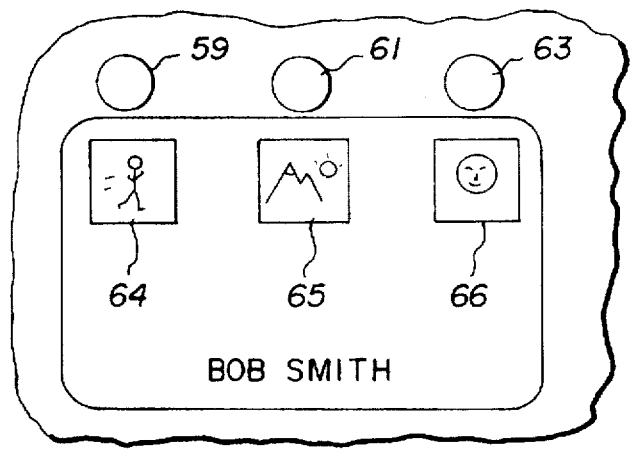
FIG. 6 is a elevational view of a portion of a camera made in accordance with the present invention illustrating selection means for placing a camera in different modes and for providing appropriate codes onto the filmstrip to be used by the photofinisher.

Placement of the instructional code is not limited to the manufacture of the film. Referring to FIG. 6, there is illustrated a portion of a camera 60 having a plurality of selection means, which in the embodiment illustrated, are selection buttons 59,61,63, which are used to place the camera in a particular setting and for providing a code onto the magnetic layer, which is indicative of the type of subject matter that has been captured onto the film. In the embodiment illustrated in FIG. 6, the camera has been programmed to have action shots, scenic shots, and close-ups indicated by indicias 64,65,66, respectively. Each of these indicias has its own separate code that is placed onto the film which will be read by the apparatus 30 for controlling of the printing process.

Figure 7:
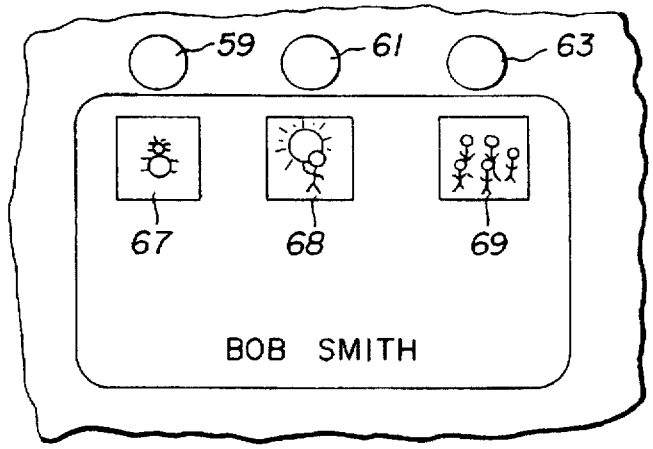
FIG. 7 is a view similar to FIG. 6 illustrating different modes of operation in a camera for providing different codes onto the film.

Referring to FIG. 7, there is illustrated the camera 60 similar to that of FIG. 6, like numerals indicating like parts, having three indicias 67,68,69 which are each illustrated of yet three different type subject matter shots that are being produced. In particular, indicia 67 indicates dark tone complexion, 68 indicates individuals outdoors, and 69 indicates a group shot. Each of these indicias also having separate instructional codes indicative of the type of subject matter that has been captured on the film. It is, of course, understood that the camera may be programmed with any number of indicia so desired. However, it may be desirable that, at least with less expensive type cameras, only a few options are available.

It may be desirable to have a camera capable of being reprogrammed at an appropriate establishment whereby these codes may be changed in accordance with the changing needs of the consumer. Referring to FIG. 8, there is illustrated in diagrammatic form how a camera can be reprogrammed to have different codes. The camera 60 can be placed in a fixture 80, which is capable of programming different codes into the camera operable by the section buttons provided on the camera. Different labels could be placed on the camera at each of the selection buttons which would correspond to the codes programmed into the camera. With more expensive cameras having an LCD or some other type display, the camera can be programmed so that the display will illustrate different icons for the various associated instructional codes programmed into the camera. Customer specific information may also be programmed into the camera. For example, but not by way of limitation, the customer name and/or address may recorded onto a magnetic recording layer on the film so that prints made from the film will have the programmed information printed thereon.

Figure 9:
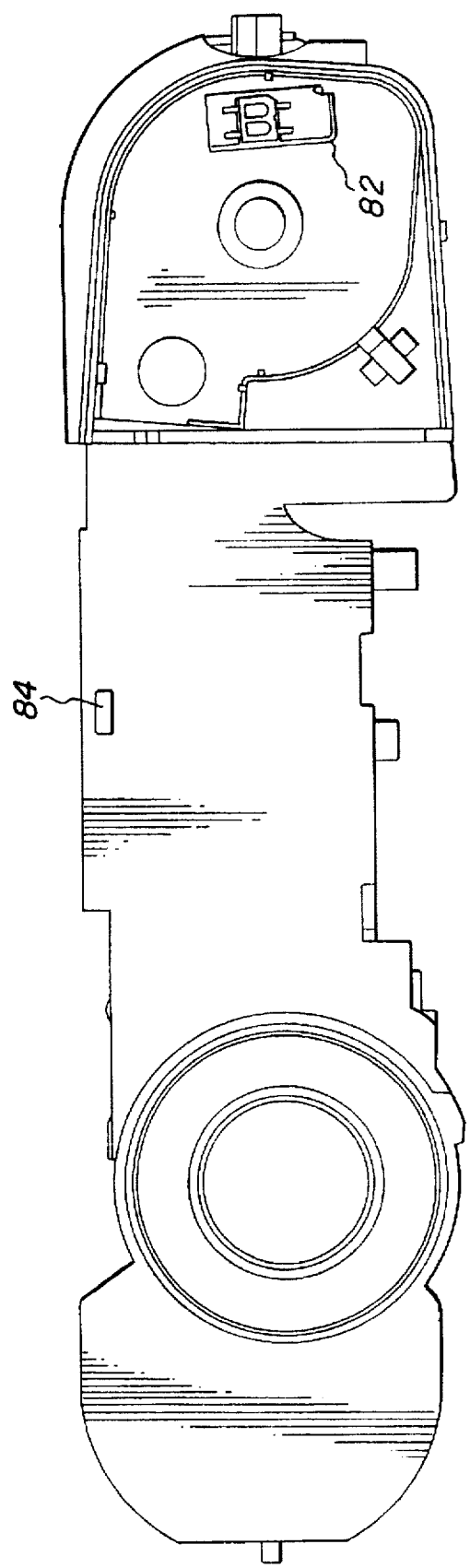
FIG. 9 is a cross-sectional view of a camera made in accordance with the present invention designed to place codes on a camera and which can be reprogrammed.

Referring to FIG. 9, there is illustrated a cross-sectional view of a camera 60 made in accordance with the present invention. In the particular embodiment illustrated, the camera 60 is designed to hold cartridge 14 at one end. The camera would have an optic coupler 82 for transmission of data to the camera memory. The optic coupler is used to reprogram a microchip (not shown) provided in the camera which is used to control the write head 84 in response to the selection buttons on the camera. The camera also has a write head 84 for placing an instructional code on the magnetic layer 120 of the film adjacent the image that is exposed in the camera.

Referring to FIG. 10, there is illustrated in schematic form a system designed to receive thrust-type film cartridges having developed or undeveloped film therein. The thrust-type film cartridge is described and disclosed in U.S. Pat. Nos. 5,031,852 and 5,215,273, which are hereby incorporated by reference. In this cartridge, a light-lock door can be moved between an open position and/or a closed position. When the door is in the open position, the filmstrip can be thrust out of, or back into the cartridge by rotation of the spool around which the filmstrip is wound. The film cartridge could be placed in the device where it would pass a magnetic head 92 and scanner 90. In the embodiment illustrated, the magnetic head 92 would read the magnetic information that is placed thereon and the scanner would scan the images (if developed images are present) for display on display screen 96. If undeveloped images are present on the filmstrip, then reading of the magnetics will be conducted and the instructional codes currently on the film is read and displayed. The customer could program additional or substitute instructional codes onto the film. The magnetic head 92 is controlled by appropriate selection buttons 97,98,99,100,101 for providing of the instructional code on the magnetic layer by magnetic head 92. Thereafter, the filmstrip would be rewound back into the cartridge which then would be sent to the photofinisher for printing or reprinting of the images thereon in accordance with instructions now placed on the film. Thus, if the film came back and the prints produced therefrom were not as desired, new additional codes could be provided for reprinting in accordance with the customer wishes so as to enhance a particular design so desired.

It is, of course, understood that various modifications may be made to the present invention. For example, use of indicia codes can be provided on single-use type cameras wherein the cameras have pre-codes with particular type uses so that when the camera is returned to the photofinisher for developing of the film contained therein, appropriate codes will be automatically read and processed accordingly. This minimizes the need and necessity of having an expensive camera in order to take full benefit of the present invention. Additionally, the cameras with these type of codes can be pre-set so that pictures are taken at appropriate settings for that type of subject matter.

It is to be understood that various other changes and modifications may be made without departing from the scope of the present invention. The present invention being defined by the following claims.

Parts List

C0,C1,C2,C3 . . . track pairs
F00–F29 . . . tracks
10 . . . package

14 ... film cartridge
16 ... trademarks
18 ... speed of the film
20 ... indicia
30 ... apparatus
34 ... supply reel
36 ... photosensitive film
38 ... print gate
40 ... take-up reel
42 ... supply reel
43 ... photographic paper
48 ... light source
50 ... sensor
51 ... magnetic read head
52 ... CPU
56 ... filters
59,61,63 ... selection buttons
60 ... camera
64,65,66,67,68,69 ... indicias
80 ... fixture
82 ... optic coupler
84 ... write head
90 ... scanner
92 ... magnetic head
96 ... display screen
97,98,99,100,101 ... selection buttons
100 ... filmstrip
100a,100b ... regions
102,104 ... film edges
108 ... predetermined nominal width
100 ... base
115 ... emulsion layers
120 ... MOF layer
122 ... antistatic and lubricating layer
125 ... perforations

We claim:

1. A system for controlling the photofinishing of a roll of photosensitive material in accordance with the customer usage of the photosensitive material, comprising:

a photosensitive material having a magnetic layer, said magnetic layer having a predetermined instructional code placed thereon by the manufacturer of the photosensitive material indicative of the preferential subject matter to be photographed; and a camera for use in reading the predetermined code, and means for adjusting the camera settings in accordance with the predetermined instructional code.

2. A system according to claim 1 further comprising a photofinishing device for producing images from said photosensitive material in accordance with said instructional code.

3. A system according to claim 2 wherein said images are produced on photographic paper.

4. A system according to claim 1 wherein said photosensitive material is provided in a package having indicia which is indicative of the instructional code.

5. A camera designed to receive a roll of photosensitive film having a magnetic layer thereon, the camera including selection means having a plurality of camera operation selections, each of said camera operation selections being indicative of a particular subject matter to be photographed, said camera having means for applying an instructional code on said magnetic layer indicative of the operation selection selected, said information instructional code being used by the photofinisher in controlling the photofinishing process of said photosensitive film.

6. A camera according to claim 5 wherein said camera is capable of being reprogrammed with different instructional codes.

7. A system for controlling photofinishing of a strip of photosensitive material based on information magnetically placed on the strip of photosensitive material, said information being indicative of the type of use to which the camera containing the photosensitive material has been used, said system comprising:

a device designed to receive a roll of photosensitive film having a magnetic layer thereon, the device including selection means having a plurality of operation selections, each of said operation selections being indicative of a particular subject matter to be photographed, said device having means for applying an instructional code on said magnetic layer indicative of the operation selection selected, said information instructional code being used by the photofinisher in controlling the photofinishing process of said photosensitive film; and a photofinishing apparatus for producing prints from said roll of photosensitive film in accordance with said instructional code.

8. The system according to claim 7 wherein said device designed to receive a roll of photosensitive film is a camera.

9. The system according to claim 7 wherein said device designed to receive a roll of photosensitive film is a fixture capable of receiving developed or undeveloped film.

10. The system according to claim 7 wherein said roll of photosensitive film is disposed within a film cartridge.

11. The system according to claim 10 wherein said cartridge is a thrust film cartridge.

12. The system according to claim 7 wherein said photofinishing apparatus comprises a digital printer capable of manipulating and printing the image in accordance with the instructional code.

13. The system according to claim 7 wherein said photofinishing apparatus comprises an optical printer capable of manipulating and printing the image in accordance with the instructional code.

14. The system according to claim 7 wherein said photosensitive material is provided in a package having indicia which is indicative of the instructional code.

15. A method for controlling the photofinishing of photosensitive material in accordance with the customer usage of the photosensitive material, comprising the steps of:

placing a predetermined instructional code on a magnetic layer provided on a photosensitive material by the manufacturer, said code being indicative of the preferential subject matter to be photographed;

reading the predetermined code and adjusting the camera settings in accordance with the instructional code; and performing a photofinishing operation on the photosensitive material in accordance with the predetermined instruction code.

16. A method according to claim 15 wherein said photofinishing operation comprises the step of printing the image present on said photosensitive material.

17. A method according to claim 16 wherein said image is printed using a digital printer which manipulates the image in accordance with said instructional code.

18. A method for controlling the photofinishing of a photosensitive material in accordance with the customer usage of the photosensitive material, comprising the steps of:

placing a predetermined code on a magnetic layer provided on a photosensitive material by the manufacturer, said code being indicative of the preferential use of the photosensitive material; and developing and/or printing the photosensitive material in accordance with the predetermined instruction codes.

19. A method for controlling the photofinishing of photosensitive material in accordance with the customer usage of the photosensitive material, comprising the steps of:

placing a predetermined code on a magnetic layer provided on a photosensitive material by the manufacturer, said code being indicative of the preferential use of the photosensitive material;

reading the predetermined code and adjusting the camera settings in accordance with the usage codes; and digitally printing the images on said photosensitive material in accordance with the predetermined instruction codes.

20. The method according to claim 19 wherein prior to printing said images, said images are digitally adjusted in accordance with said instructional codes.

* * * * *

UNITED STATES PATENT AND TRADEMARK OFFICE
CERTIFICATE OF CORRECTION

PATENT NO. : 5,726,737
DATED : March 10, 1998
INVENTOR(S) : John R. Fredlund, et al It is certified that error appears in the above-identified patent and that said Letters Patent is hereby corrected as shown below:

```
On the title page, Item [60] Related U.S. Application Data
     Insert Provisional application no. 60,006,177,
     November 2, 1995.
```

Signed and Sealed this

Fifteenth Day of September, 1998

Attest:

BRUCE LEHMAN

Attesting Officer

Commissioner of Patents and Trademarks